United States Patent [19]

Fischbeck et al.

[11] Patent Number: 4,584,590

[45] Date of Patent: Apr. 22, 1986

[54] SHEAR MODE TRANSDUCER FOR DROP-ON-DEMAND LIQUID EJECTOR

[75] Inventors: Kenneth H. Fischbeck, Dallas; Allen T. Wright, Lewisville, both of Tex.

[73] Assignee: Xerox Corporation, Stamford, Conn.

[21] Appl. No.: 736,513

[22] Filed: May 20, 1985

Related U.S. Application Data

[63] Continuation of Ser. No. 382,866, May 28, 1982, abandoned.

[51] Int. Cl.[4] ............................................ G01D 15/16

[52] U.S. Cl. ................................ 346/140 R; 310/333; 310/366

[58] Field of Search .................. 346/140, 75; 310/333, 310/328, 366; 400/126

[56] References Cited

U.S. PATENT DOCUMENTS

| | | | |
|---|---|---|---|
| 2,512,743 | 6/1950 | Hansell | 346/140 X |
| 2,951,894 | 9/1960 | Hirsch | 346/140 X |
| 3,857,049 | 12/1974 | Zoltan | 346/140 X |
| 3,946,398 | 3/1976 | Kyser | 346/140 X |
| 4,019,073 | 4/1977 | Vishnevsky | 310/333 |
| 4,243,995 | 1/1981 | Wright | 346/140 |
| 4,272,200 | 6/1981 | Hehl | 310/328 X |

FOREIGN PATENT DOCUMENTS 2256667 6/1974 Fed. Rep. of Germany .

OTHER PUBLICATIONS

Buchanan, J. P.; Handbook of Piezoelectric Crystals for Radio Equipment Designers, NADCT Report 54-248, Dec. 1954, pp. 15-18.

Stemme et al.; The Piezoelectric Capillary Injector . . . Generation; IEEE Transactions on Electron Devices, Jan. 1973, pp. 14-19.

Tsao, C. S.; Drop-on-Demand Ink Jet Nozzle Array with Two Nozzles/Piezoelectric Crystal; IBM TDB, vol. 23, No. 10, Mar. 1981, p. 4438.

*Primary Examiner*—Joseph W. Hartary
*Attorney, Agent, or Firm*—Richard A. Tomlin; Sheldon F. Raizes

[57] ABSTRACT

A single piezoelectric transducer is used to drive an array of drop-on-demand ink jet ejectors. This is accomplished by utilizing a plurality of electrodes which divide the piezoelectric transducer into discrete, deformable sections, each section corresponding to an ejector.

26 Claims, 6 Drawing Figures

SHEAR MODE TRANSDUCER FOR DROP-ON-DEMAND LIQUID EJECTOR

This is a continuation of Ser. No. 382,866, filed May 28, 1982, now abandoned.

The invention relates to a drop-on-demand liquid droplet ejecting apparatus wherein a single piezoelectric transducer used in a shear mode is shared by more than one ejector. The transducer is segmented for operation in the shear mode by utilizing a series of electrodes formed on its surface. This invention can be utilized in any pressure pulse drop ejector apparatus; however, the greatest benefits are realized when the shear mode transducer concept of this invention is utilized in a drop-on-demand ink jet printing system. Accordingly, the present invention will be described in connection with such an ink jet recording system.

Ink jet printers are well known in the art, many commercial units being presently on the market. Generally, these ink jet printers utilize a piston-like push-pull action to eject ink drops from a small nozzle to form an image. Typically, a piezoelectric transducer is used to provide the piston-like action. A piezoelectric transducer is a device that converts electrical energy into mechanical energy. Several transducer arrangements have been proposed for drop-on-demand ink jet printers. In U.S. Pat. No. 2,512,743 to C. W. Hansell, issued June 27, 1950, an ink jet was described in which the circular piezoelectric transducer was used in an extensional mode, the extension being along the axis to drive ink. The piezoelectric transducer was arranged coaxially with a conical nozzle, the axial extension used to create pressure waves causing expression of droplets from the nozzle.

Another basic arrangement was disclosed in "The Piezoelectric Capillary Injector—A New Hydrodynamic Method for Dot Pattern Generation", *IEEE Transactions on Electron Devices,* January, 1973, pp. 14–19. In the system disclosed, a bilaminar piezoelectric metallic disk is used to drive ink coaxially with the bilaminar disk. In that system, application of an electrical voltage pulse across the disk causes the disk to contract resulting in the deflection of the disk into the ink, forcing droplet ejection. U.S. Pat. No. 3,946,398, issued Mar. 23, 1976, shows a similar device; however, as disclosed in that patent, the deflection of the disk is used to eject ink through an orifice, the axis of drop ejection being perpendicular to the axis of the disk.

Another arrangement is shown in U.S. Pat. No. 3,857,049, issued Dec. 24, 1974. In the arrangement shown in FIG. 1 through FIG. 4 of that patent, a tubular transducer surrounds a channel containing the ink; and the transducer, when excited by application of an electrical voltage pulse, squeezes the channel to eject a droplet. As shown in FIG. 6 of that patent, there is disclosed a system in which the radial expansion of a disk in response to an electrical voltage pulse is used to compress ink in circumferential channels thereby forcing ink droplets out of a nozzle. In U.S. Pat. No. 4,243,995, issued Jan. 6, 1981, to us there is shown a drop-on demand ink jet printer in which a rectangular piezoelectric transducer is arranged abaxially over an ink-containing channel with an edge in operating relationship with the channel.

In each of the above examples, the excitation electrical field is applied parallel to the direction of transducer polarity. Also, in all of these examples, each individual jet has its own discrete transducer. Such structures are relatively time-consuming and expensive to manufacture. The invention as claimed is intended to provide an improved drop-on-demand ink jet printer which is relatively simple and inexpensive to manufacture. This is accomplished by utilizing a single transducer in the shear mode to provide the driving pulse for a plurality of jets. To do this, the transducer is provided with a plurality of electrode segments, each segment associated with a separate ink channel.

The invention can better be understood by reference to the following description particularly when taken in conjunction with the attached drawing which shows a preferred embodiment. Thicknesses and other dimensions have been exaggerated as deemed necessary for explanatory purposes.

In all of the Figures, the same parts are given the same number designations. The Figures are not drawn to scale.

Figure 1A:
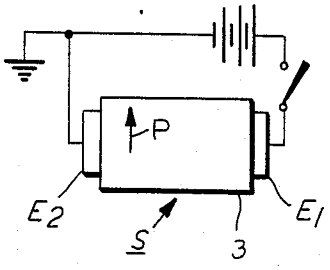
FIGS. 1A and 1B show greatly exaggerated how the shear mode electrical excitation, that is, the excitation potential is applied orthogonal to the direction of polarization of the transducer, affects a piezoelectric transducer segment.
Figure 1B:
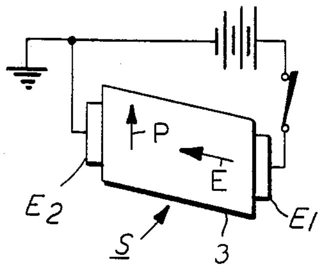

Referring now to FIGS. 1A and 1B, there is shown a piezoelectric member 3 rectangular segment S. The piezoelectric member 3 is polarized in the direction P in this exemplary instance. Referring to FIG. 1B, application of a potential between electrodes $E_1$ and $E_2$, in the direction or vector indicated by arrow E orthogonal to the direction of polarization P, causes internal shear within segment S causing a distortion of segment S as shown by comparing FIG. 1A with no potential applied with FIG. 1B with potential applied. This principle can be utilized to provide a deflecting member useful as a driver in a pressure pulse ejector as can be understood by reference to FIG. 2.

Figure 2:
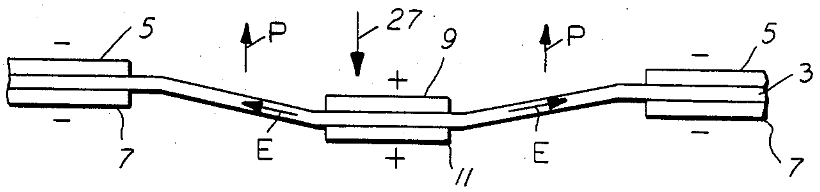
FIG. 2 is a side view of a larger section of a piezoelectric transducer showing greatly exaggerated how the piezoelectric transducer is deflected by the shear mode excitation of the transducer.

Referring now to FIG. 2, there is shown a side view of a piezoelectric member 3 in its fully deflected position with electrodes 5, 7, 9 and 11 formed thereon as shown. A more detailed description of the electroded array appears below in connection with FIGS. 3–5. In FIG. 2, electrodes 9 and 11 are made, in this exemplary instance, positive and electrodes 5 and 7, negative. The resulting electric field vector is shown as E. The piezoelectric material 3 shears in the direction of the cross product of the polarization vector P and the electric field vector E causing the piezoelectric member 3 in the vicinity of electrodes 9 and 11 to deflect in the direction shown by arrow 27 to the position depicted in FIG. 2. Although in FIG. 2, the electrodes 11 and 7 on the lower surface of piezoelectric member 3 are illustrated as excited, it has been shown that, due to the high capacitance coupling between electrodes 11 and 9 and the high capacitance coupling between 7 and 5, it is not necessary to independently excite electrodes 11 and 7 to have piezoelectric member 3 shear or deflect to the position shown in FIG. 2.

Figure 5:
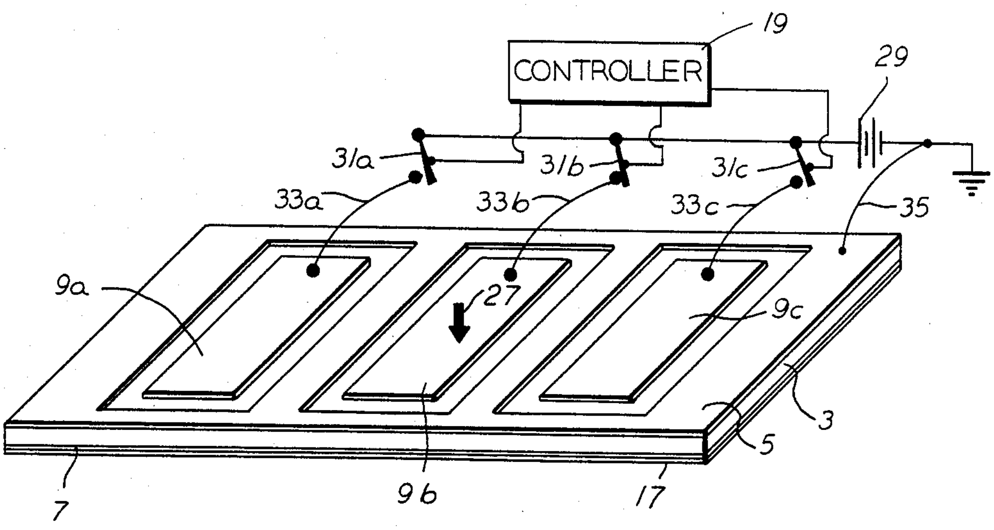
FIG. 5 is a perspective view of the piezoelectric member only showing the electrode arrangement and a schematic representation of a drive circuit for the array of FIG. 3.
Figure 3:
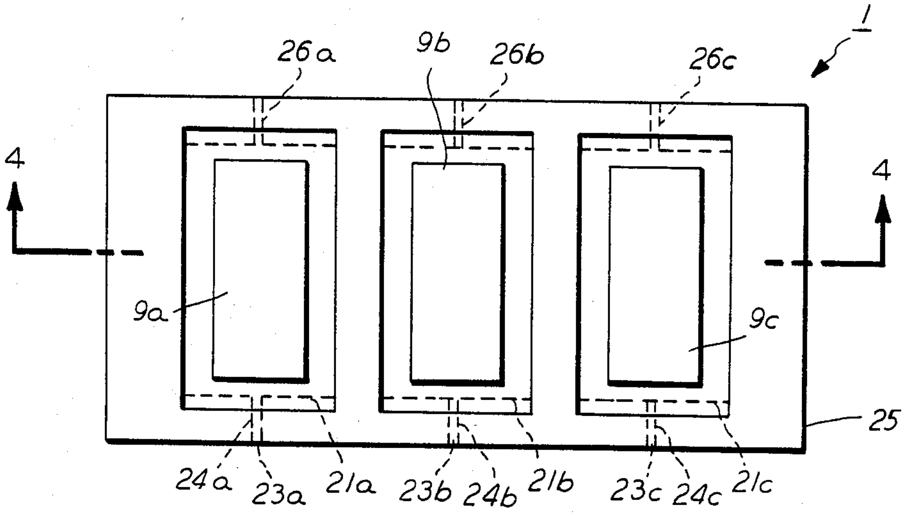
FIG. 3 is a top view of an ejector array in accordance with the present invention.
Figure 4:
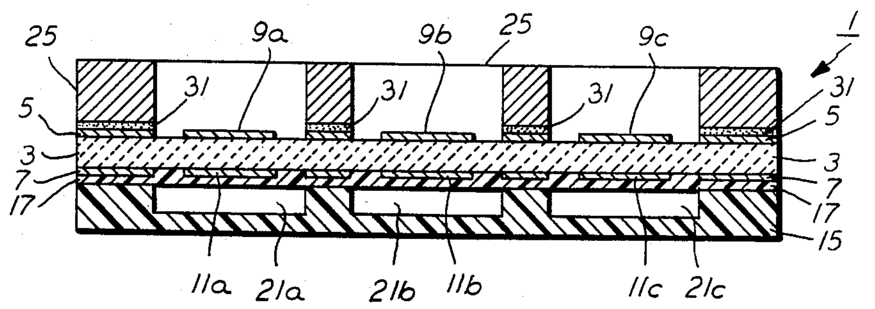
FIG. 4 is a cross-sectional view of the ejector array of FIG. 3 taken along line 4—4 in FIG. 3.

Referring now to FIGS. 3, 4 and 5, there is seen ejector array generally designated 1, which, in this exemplary instance, comprises three ejectors. Ejector array 1 has a single piezoelectric member 3 for driving the three ejectors. Piezoelectric member 3 has electrodes 5, 7, 9*a*, 9*b*, 9*c* and 11*a*, 11*b*, 11*c* formed on its surfaces as shown in the Figures. Piezoelectric member 3 is attached to ink jet ejector body 15 (see FIG. 4). Ejector body 15 has, in this exemplary instance, three ink channels 21 formed in it. Ink channels 21 are connected to ink channel outlet orifices 23 by reduced sections 24. A source of ink (not shown) is connected to ink channels 21 by similar reduced sections 26. Ink channels 21 and ink channel body 15 are separated from piezoelectric member 3 by an isolating layer 17 (see FIG. 4). A reaction block 25 is attached to the opposite surface of piezoelectric member 3. A shown in FIG. 5 in this exemplary embodiment, electrode 5 is connected to one side of power supply 29, and active electrodes 9 are connected by controller 19 to the other side of power supply 29. A controller 19 is provided, which responds to an input image signal representative of the image it is desired to print by closing and opening selected ones of switches 31. In order for the piezoelectric member 3 to operate as a source of driving pulses for ink contained in ink channels 21, it is necessary to first polarize the piezoelectric member 3. This is usually done by the manufacturer and entails applying a DC potential difference across the narrow dimension in direction P (see FIG. 2) of the whole of the piezoelectric member 3 between the surface on which electrode 5 is formed and the surface on which electrode 7 is formed. In order to drive individual ejectors, which is required for drop-on-demand ink jet printers, it is necessary to divide the piezoelectric member 3 into discrete deformable sections. This is accomplished by providing a series of electrodes 9 on piezoelectric member 3, each electrode 9 corresponding to an ink channel 21. Application of an electrical potential difference of the proper polarity between electrode 5 and an electrode 9 will cause piezoelectric member 3 to deform into the ink channel 21, which is located under the activated or pulsed electrode 9, causing compression of the ink contained in ink channel 21 and the resultant ejection of an ink droplet from ink channel outlet orifice 23.

To increase the efficiency of operation and to minimize cross-coupling, a reaction clamp block 25 may be used. The purpose of this block is to provide a strong footing against which the piezoelectric member 3 can push. Reaction clamp block 25 may conveniently be bonded to electrode 5 by insulating adhesive layer 31. Reaction clamp block 25 is shaped approximately the same as electrode 5 so as not to interfere with the deflection of piezoelectric member 3 under electrodes 9.

In operation, ink channels 21 are filled with ink through reduced sections 26 from an ink supply source not shown. A controller 19, which responds to an input image signal (not shown) closes the appropriate switch, which applies an electrical potential difference from power supply 29 between electrode 9 and surrounding electrode 5. Typical drive circuits for drop-on-demand ink jet ejectors are well known in the art (see, for example, U.S. Pat. No. 4,216,483, issued Aug. 5, 1980, U.S. Pat. No. 4,266,232, issued May 5, 1981, and copending commonly assigned application Ser. No. 257,699, filed Apr. 27, 1981).

Referring now specifically to FIG. 5, controller 19 has closed switch 31*b* leading to electrode 9*b* on the center ejector. By closing switch 31*b*, power supply 29 is connected such that an electrical pulse is applied between electrode 9*b* and surrounding electrode 5 causing piezoelectric member 3 to deflect in the direction shown by arrow 27. Deflection of piezoelectric member 3 into ink channel 21*b* causes a droplet (not shown) to be ejected from orifice 23*b* (see FIG. 3).

It can be seen that electrodes 7 and 11*a*, 11*b*, 11*c* need not be involved in the operation of the ejector. Also, it can readily be seen that the same principle of operation can apply to an array of indefinite length, the practical limiting factor being the length of piezoelectric material, which is commercially vailable. As an example, a three-jet ejector array was made from a 0.3 by 0.64 by 0.015 inch piezoelectric member 3 having nickel electrodes on both major surfaces and having been polarized by the manufacturer. Such piezoelectric members 3 are available commercially from Vernitron Piezoelectric Division, Bedford, Ohio. The piezoelectric member 3 is masked and portions of the nickel removed to form the pattern as shown in the Figures on both the upper and lower surfaces. Electrical lead-in wires 33 and 35 are then connected to electrodes 9 and 5, respectively. The entire surface on which electrodes 7 and 11 are formed is coated with an epoxy layer 17, which acts as a seal for ink channels 21 when ejector body 15 is attached to piezoelectric member 3. Ejector body 15 measures approximately 0.3 by 0.64 by 0.125 inches and is made of castable epoxy Stycast 1267, available from Emerson & Cuming, Inc., Canton, Mass. The ink channels measure approximately 0.12 inches wide by 0.010 inches deep. The outlet orifice is approximately 0.002 inches in diameter. The epoxy layer is about 0.0006 inches thick. A brass block, shaped similar to electrode 5 and being about 0.125 inches thick, may, if desired, then be bonded to electrode 5 using Stycast 1267 epoxy, available from Emerson & Cuming, Inc. Electrodes 9*a–c* and 11*a–c* measure about 0.08 inches by 0.22 inches. The space between electrodes 9*a–c* and electrode 5 is about 0.02 inches. The space between electrodes 11*a–c* and electrode 7 is the same. A 20-microsecond electrical potential application between electrodes 9 and 5 of about 200 volts at a frequency of up to and exceeding 6000 hertz has been found to be useful in a drop-on-demand ink jet ejector environment.

Although the present invention has been disclosed in connection with a preferred embodiment, it is to be understood that the invention is entitled to the protection as described in the appended claims.

What is claimed is:

1. In a pressure pulse droplet ejector:

a fluid pressure chamber housing having a portion thereof forming an opening into said chamber, means extending across said opening to form a deformable wall of said chamber, said means comprising a piezoelectric transducer, the portion of said piezoelectric transducer which is adjacent the perimeter of said portion of said fluid pressure chamber forming said opening being restrained against movement relative to said housing, said piezoelectric transducer having a polarized portion which is free for reciprocal deformation relative to said housing in the general direction of polarization, the direction of polarization being generally transverse to the direction in which said piezoelectric transducer extends across said opening, means for applying an electrical field to said polarized portion substantially orthogonal to the polarization field to cause said polarized portion to deform in shear in the general direction of polarization to vary the volume of said chamber.

2. The structure as recited in claim 1 wherein said means for applying said electrical field comprises:

first electrode means and second electrode means, means for applying a potential of a first magnitude to said first electrode means, and means for applying a potential of a second magnitude to said second electrode means, said first and second electrode means being spaced from each other in a manner to create an electrical field substantially orthogonal to the polarization field when said potentials are applied thereto.

3. The structure as recited in claim 1 wherein said means for applying said electrical field comprises:

first electrode means and second electrode means being generally in the same plane as said first electrode means and being laterally spaced from and surrounding at least a portion of said first electrode means, means for applying a potential of a first magnitude to said first electrode means, and means for applying a potential of a second magnitude to said second electrode means, whereby an electrical field substantially orthogonal to the polarization field is created.

4. The structure as recited in claim 3 wherein said first electrode means is attached to said polarized portion of said piezoelectric transducer.

5. The structure as recited in claim 3 wherein said first electrode means is completely surrounded by said second electrode means.

6. The structure as recited in claim 1, wherein said means for applying said electrical field comprises:

first electrode means and second electrode means at one level of the piezoelectric transducer, said second electrode means being laterally spaced from and surrounding at least a portion of said first electrode means, third electrode means and fourth electrode means at a second level of the piezoelectric transducer, said fourth electrode means being laterally spaced from and surrounding at least a portion of said third electrode means, said first and third electrode means being generally coextensive and aligned with each other, said second and fourth electrode means being generally coextensive and aligned with each other, means for applying a potential of a first magnitude to said first and third electrode means, and means for applying a potential of a second magnitude to said second and fourth electrode means, whereby an electrical field substantially orthogonal to the polarization field is created by the potentials applied to said first and second electrode means and by the potentials applied to said third and fourth electrode means.

7. The structure as recited in claim 6 wherein said one level is on one surface of the piezoelectric transducer and said second level is on the opposite surface of the piezoelectric transducer.

8. The structure as recited in either of claims 6 or 7 wherein said piezoelectric transducer is a generally flat member.

9. The structure as recited in claim 6 wherein said means for applying a potential of said magnitude to said third electrode means is by high capacitance coupling with said first electrode means.

10. The structure as recited in either of claims 6 or 9 wherein said means for applying a potential of said second magnitude to said fourth electrode means is by high capacitance coupling with said second electrode means.

11. In a pressure pulse droplet ejector:

a housing containing at least two fluid pressure chambers, said housing having a portion thereof forming an opening into each said chamber, means extending across said openings of said chambers to form a deformable wall of each of said chambers, said means comprising a piezoelectric transducer, the portion of said piezoelectric transducer which is adjacent the perimeter of said portion of a respective said fluid pressure chamber forming said opening being restrained against movement relative to said housing, said piezoelectric transducer having first and second polarized portions, one for each chamber, which are free for reciprocal deformation relative to said housing in the general direction of polarization, the direction being generally transverse to the direction in which said piezoelectric transducer extends across said openings, first means for applying an electrical field to said first polarized portion substantally orthogonal to the polarization field to cause said first polarized portion to deform in shear in the general direction of polarization to vary the volume of its respective chamber, and second means for applying an electrical field, independently of the electrical field applied to said first portion, to said second polarized portion substantially orthogonal to the polarization field to cause said second polarized portion to deform in shear in the general direction of polarization to vary the volume of its respective chamber chambers.

12. The structure as recited in claim 11 wherein:

said first means for applying said electrical field comprises first electrode means and electrode means spaced from said first electrode means, said second means for applying said electrical field comprises second electrode means and electrode means spaced from said second electrode means, said first means for applying said electrical field further comprises means for applying a potential of a first magnitude to said first electrode means and means for applying a potential of a second magnitude to said electrode means spaced from said first electrode means, said second means for applying said electrical field further comprises means for applying a potential of said first magnitude to said second electrode means and means for applying a potential of said second magnitude to said electrode means spaced from said second electrode means, said first electrode means and said electrode means spaced therefrom being spaced in such a manner to create an electrical field substantially orthogonal to the polarization field of said first portion when said potentials are applied thereto, said second electrode means and said electrode means spaced therefrom being spaced in such a manner to create an electrical field substantially orthogonal to the polarization field of said second portion when said potentials are applied thereto.

13. The structure as recited in claim 11 wherein:

said first means for applying said electrical field comprises first electrode means and electrode means being generally in the same plane as said first electrode means and laterally spaced from and surrounding at least a portion of said first electrode means, said second means for applying said electrical field comprises second electrode means and electrode means being generally in the same plane as said second electrode means and laterally spaced from and surrounding at least a portion of said second electrode means, said first means for applying said electrical field further comprises means for applying a potential of a first magnitude to said first electrode means and means for applying a potential of a second magnitude to said electrode means surrounding at least a portion of said first electrode means, said second means for applying said electrical field further comprises means for applying a potential of said first magnitude to said second electrode means and means for applying a potential of said second magnitude to said electrode means surrounding at least a portion of said second electrode means, whereby an electrical field substantially orthogonal to said polarization field of said first portion of said piezoelectric transducer is created by the potentials applied to said first electrode means and said electrode means surrounding at least a portion thereof and an electrical field substantially orthogonal to said polarization field of said second portion of said piezoelectric transducer is created by the potentials applied to said second electrode means and said electrode means surrounding at least a portion thereof.

14. The structure as recited in either claims 13 wherein each of said fluid pressure chambers have an open end bridged by said piezoelectric transducer, said first portion of said piezoelectric transducer bridges said one chamber, said second portion of said piezoelectric transducer bridges said other chamber, said first electrode means is attached to said first portion of said piezoelectric transducer and said second electrode means is attached to said second portion of said piezoelectric transducer.

15. The structure as recited in claim 13 wherein said first and second electrode means are completely surrounded by said third electrode means.

16. The structure as recited in claim 11 wherein:

said first means for applying said electrical field comprises first electrode means at one level of said piezoelectric transducer and electrode means at said one level laterally spaced from and surrounding at least a portion of said first electrode means; second electrode means at a second level of said piezoelectric transducer and electrode means at said second level laterally spaced from and surrounding at least a portion of said second electrode means;

said second electrode means and said electrode means surrounding at least a portion of said second electrode means being generally coextensive and aligned with said first electrode means and said electrode means surrounding at least a portion of said first electrode means, respectively;

said second means for applying said electrical field comprises third electrode means at said one level of said piezoelectric transducer and electrode means at said one level laterally spaced from and surrounding at least a portion of said third electrode means; fourth electrode means at said second level of said piezoelectric transducer and electrode means at said second level laterally spaced from and surrounding at least a portion of said fourth electrode means, said fourth electrode means and said electrode means surrounding at least a portion of said fourth electrode means being generally coextensive and aligned with said third electrode means and said electrode means surrounding at least a portion of said third electrode means, respectively;

said first means for applying said electrical field further comprises means for applying a potential of a first magnitude to said first and second electrode means and means for applying a potential of a second magnitude to said electrode means surrounding at least a portion of said first electrode means and to said electrode means surrounding at least a portion of said second electrode means;

said second means for applying said electrical field further comprises means for applying a potential of said first magnitude to said third and fourth electrode means and means for applying a potential of said second magnitude to said electrode means surrounding at least a portion of said third electrode means and to said electrode means surrounding at least a portion of said fourth electrode means;

whereby an electrical field substantially orthogonal to said polarization field of said first portion of said piezoelectric transducer is created by the potentials applied to said first electrode means and said electrode means surrounding at least a portion thereof and by the potentials applied to said second electrode means and said electrode means surrounding at least a portion thereof and an electrical field substantially orthogonal to said polarization field of said second portion of said piezoelectric transducer is created by the potentials applied to said third electrode means and said electrode means surrounding at least a portion thereof and by the potentials applied to said fourth electrode means and said electrode means surrounding at least a portion thereof.

17. The structure as recited in either of claims 16 wherein said first and second electrode means is attached to said first polarized portion of said piezoelectric transducer, and said third and fourth electrode means is attached to said second polarized portion of said piezoelectric transducer

18. The structure as recited in either of claims 16 or 17 wherein said one level is on one surface of the piezoelectric transducer and said second level is on the opposite surface of the piezoelectric transducer.

19. The structure as recited in either of claims 16 or 17 wherein said piezoelectric transducer is generally a flat member and said one level is on one surface of the piezoelectric transducer and said second level is on the opposite surface of the piezoelectric transducer.

20. The structure as recited in claim 11 wherein:

said first means for applying said electrical field comprises first electrode means, said second means for applying said electrical field comprises second electrode means, said first electrode means being laterally spaced from and generally in the same plane as said second electrode means, said first and second means for applying said electrical field further comprises third electrode means being generally in the same plane as said first and second electrode means, said third electrode means being laterally spaced from and surrounding at least a portion of each of said first and second electrode means, said first means for applying said electrical field further comprises means for applying a potential of a first magnitude to said first electrode means and means for applying a potential of a second magnitude to said third electrode means, said second means for applying said electrical field further comprises means for applying a potential of said first magnitude to said second electrode means, and said means for applying a potential of said second magnitude to said third electrode means, whereby an electrical field substantially orthogonal to said polarization field of said first portion of said piezoelectric transducer is created by the potentials applied to said first electrode means and said third electrode means and an electrical field substantially orthogonal to said polarization field of said second portion of said piezoelectric transducer is created by the potentials applied to said second electrode means and said third electrode means.

21. The structure as recited in claim 7 wherein:

said first means for applying said electrical field comprises first electrode means at one level of said piezoelectric transducer and second electrode means at a second level of said piezoelectric transducer being generally coextensive and aligned with said first electrode means, said second means for applying said electrical field comprises third electrode means at said one level of said piezoelectric transducer and laterally spaced from said first electrode means and fourth electrode means at said second level of said piezoelectric transducer being generally coextensive and aligned with said third electrode means, said first and second means for applying said electrical field further comprises fifth electrode means at said one level and laterally spaced from and surrounding at least a portion of each of said first and third electrode means and sixth electrode means at said second level of said piezoelectric transducer being generally coextensive and aligned with said fifth electrode means, said first means for applying said electrical field further comprises means for applying a potential of a first magnitude to said first and second electrode means and means for applying a potential of a second magnitude to said fifth and sixth electrode means, said second means for applying said electrical field further comprises means for applying a potential of said first magnitude to said third and fourth electrode means and means for applying a potential of said second magnitude to said fifth and sixth electrode means, whereby an electrical field substantially orthogonal to said polarization field of said first portion of said piezoelectric transducer is created by the potentials applied to said first and fifth electrode means and by the potentials applied to said second and sixth electrode means and an electrical field substantially orthogonal to said polarization field of said second portion of said piezoelectric transducer is created by the potentials applied to said third and fifth electrode means and by the potentials applied to said fourth and sixth electrode means.

22. The structure as recited in claim 21 wherein said means for applying a potential of said first magnitude to said fourth electrode means is by high capacitance coupling with said second electrode means.

23. The structure as recited in either of claims 21 or 22 wherein said means for applying a potential of said first magnitude to said fourth electrode means is by high capacitance coupling with said third electrode means.

24. The structure as recited in either of claims 21 or 22 wherein said means for applying a potential of said second magnitude to said sixth electrode means is by high capacitance coupling with said fifth electrode means.

25. The structure as recited in claim 24 wherein said means for applying a potential of said first magnitude to said fourth electrode means is by high capacitance coupling with said third electrode means and said means for applying a potential of said second magnitude to said sixth electrode means is by high capacitance coupling with said fifth electrode means.

26. The structure as recited in claim 25 wherein said means for applying a potential of said first magnitude to said second electrode means is by high capacitance coupling with said first electrode means.

* * * * *